(No Model.)
G. WALTER.
CART SPRING.
No. 270,164.　　　　　　　Patented Jan. 2, 1883.
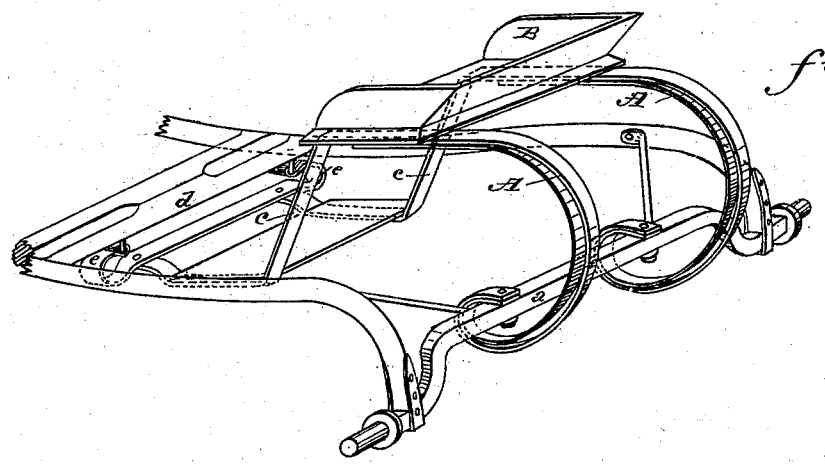
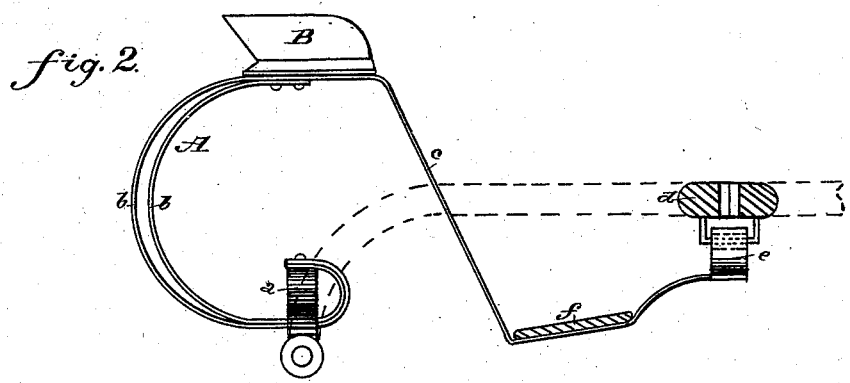
WITNESSES:　　　　　　　　　INVENTOR:
　　　　　　　　　　　　　　　G. Walter
　　　　　　　　　　　　　BY Munn & Co
　　　　　　　　　　　　　　　ATTORNEYS.

United States Patent Office.

GUSTAVE WALTER, OF SANDWICH, ILLINOIS.

CART-SPRING.

SPECIFICATION forming part of Letters Patent No. 270,164, dated January 2, 1883.

Application filed May 26, 1882. (No model.)

*To all whom it may concern:*

Be it known that I, GUSTAVE WALTER, of Sandwich, in the county of De Kalb and State of Illinois, have invented a new and Improved Cart-Spring, of which the following is a full, clear, and exact description.

This invention relates to an improvement in vehicle-springs; and it consists of springs having their forward ends extending downward and connected to a transverse spring secured to a cross-bar of the shafts, substantially as hereinafter more fully set forth.

Reference is to be had to the accompanying drawings, forming a part of this specification, in which similar letters of reference indicate corresponding parts in both the figures.

Figure 1 is a perspective view of a road cart or wagon provided with my improved spring. Fig. 2 is a side view of the spring, showing its connection to form the foot-board support.

A are the springs, attached at one end to the axle $a$, and supporting the seat B. Each spring is composed of two leaves, $b\ b$, bent in C form, and connected together at their attachment to the axle and to the seat, but not in contact between those two points, so that they form a spring-brace for the support of the seat much stronger than a single spring and of great elasticity. The bends of the springs are behind the seat, and they are extended down at the front of the seat, as shown at $c\ c$, their forward ends extending beneath the cross-bar $d$ of the shafts, where the ends are connected to a cross-spring, $e$, that is attached to the cross-bar $d$. Upon the end $c$ of the springs A the foot-board $f$ is fixed. By this construction and arrangement I furnish a combined seat and foot-board spring of durable character, easy riding, and of ornamental appearance.

Having thus described my invention, I claim as new and desire to secure by Letters Patent—

The seat-springs A, having their ends extending downward and connected to the spring $e$ on the cross-bar $d$ of the shafts, substantially as shown and described.

GUSTAVE WALTER.

Witnesses:
S. PARK SEDGWICK,
WESTEL W. SEDGWICK.